United States Patent [19]

Hwo et al.

[11] 4,359,544

[45] Nov. 16, 1982

[54] SYNERGISTIC CO-NUCLEANTS FOR BUTENE-1 POLYMER COMPOSITIONS

[75] Inventors: Charles C. Hwo, Sugarland; John A. Martone, Houston, both of Tex.

[73] Assignee: Shell Oil Company, Houston, Tex.

[21] Appl. No.: 344,285

[22] Filed: Feb. 1, 1982

[51] Int. Cl.$^3$ ................... C08L 23/20; C08L 23/06; C08K 5/20
[52] U.S. Cl. ................... 524/232; 525/240; 524/528
[58] Field of Search .............. 525/240; 524/232

[56] References Cited

U.S. PATENT DOCUMENTS

| 3,733,373 | 5/1973 | McConnell et al. | 525/240 |
| 3,756,997 | 9/1973 | Eichers et al. | 524/159 |
| 4,322,503 | 3/1982 | Chatterjee et al. | 524/232 |

*Primary Examiner*—Carman J. Seccuro
*Attorney, Agent, or Firm*—Dean F. Vance

[57] ABSTRACT

The crystallization from the melt of an isotactic butene-1 homopolymer composition, isotactic butene-1-ethylene copolymer or isotactic butene-1-propylene copolymer composition is promoted by adding a small amount of stearamide and high density polyethylene as nucleating agents. The two nucleating agents cooperate in a synergistic fashion, resulting in much faster processing rates.

6 Claims, No Drawings

SYNERGISTIC CO-NUCLEANTS FOR BUTENE-1 POLYMER COMPOSITIONS

BACKGROUND OF THE INVENTION

1. Field of the Invention

The present invention relates to a method for promoting the crystallization of thermoplastic butene-1 polymer compositions. More particularly, this invention is related to the addition of small amounts of two specific nucleating agents to butene-1 polymer compositions, wherein the two nucleating agents cooperate in a synergistic fashion in improving the processing rate of the butene-1 polymer.

2. Description of the Prior Art

Heterogeneous nucleation via the addition of a foreign material or nucleating agent is well known. See, example, Chatterjee et al, *J. Polym. Sci.; Polym. Phys. Ed.*, Vol. 13, 2369-83 and 2385-90 (1975). As demonstrated therein, heterogeneous nucleation is highly selective and there is no evidence of a universally strong nucleating agent for all polymers. In other words, an effective nucleating agent for one polymer may be ineffective for even a closely related polymer; similarly, even a compound closely related to an effective nucleating agent for one polymer may be ineffective for that same polymer. Chatterjee et al also disclose the use of nylons (polyamides) as nucleating agents. Nucleation and specific nucleating agents are discussed in Binsbergen, *J. Polym. Sci.; Polym. Symposium*, Vol. 59, 11-29 (1977).

The use of a nucleating agent to accelerate crystallization allows for faster processing and results in a more uniform microstructure because of the reduced size of the spherulites which form upon melt crystallization. The products also generally demonstrate improved physical and mechanical properties. See, for example, Rubin, Injection Molding Theory and Practice, pp. 192 (1972). In general, a desirable nucleating agent is effective at low levels of addition, both for reasons of economy and the avoidance of undue foreign structural heterogeneity which may otherwise affect the properties of the polymer.

Belgian Patent 695,803 and U.S. Pat. No. 3,756,997 disclose a variety of nucleating agents for butene-1 polymers. Specific examples include polyropylene, coumarone-indene resin, aluminum silicate, clay and aromatic sulfonic acids. Other nucleating agents are disclosed in the following copending applications: Graphitic non-turbostatic carbon nucleating agents are disclosed in copending application Ser. No. 183,869 filed Sept. 4, 1981 (having common assignee), now U.S. Pat. No. 4,321,334. Fatty acid amide nucleating agents are disclosed in copending application Ser. No. 216,055 filed Dec. 15, 1980 (having common assignee), now U.S. Pat. No. 4,322,503. These fatty acid amides include specifically N,N'-ethylene-bis-stearamide and stearamide. Anthraquinone nucleating agents are disclosed in copending patent application Ser. No. 218,865 filed Dec. 22, 1980 (having common assignee), now abandoned. Specific anthraquinones include 1,2-dihydroxy-9,10-anthraquinone; 1,4-dihydroxy-9,10-anthraquinone; 9,10-anthraquinone; and sodium 2-anthraquinone sulfonate. Amide nucleating agents are disclosed in copending application Ser. No. 214,148 filed Dec. 8, 1980 (having common assignee), now U.S. Pat. No. 4,320,209. Preferred amides include 1-naphthalene acetamide; N-stearoyl-p-aminophenol; mercapto-N-2-naphthylacetamide; malonamide; nicotinamide; isonicotinamide; benzamide; phthalimide; salicylamide; anthranilamide; and 1,8-naphthalimide.

In U.S. Pat. No. 3,733,373 to McConnell et al, the invention is directed to improving the usefulness of butene-1 homo- or copolymers as molding resins. The patentees disclose that addition of high or medium density polyethylene substantially increases the crystallization temperature of the poly-1-butene and permits the blends to mold extremely well and to be released from the mold without being punctured or dented by the knock-out pins.

It has now been discovered that a combination of two specific additives cooperate in a synergistic fashion, resulting in much more rapid processing speeds.

SUMMARY OF THE INVENTION

This invention is directed to a method for promoting crystallization from the melt of an isotactic butene-1 homopolymer, an isotactic butene-1-ethylene copolymer having no more than about 15 mole percent of ethylene, or an isotactic butene-1-propylene copolymer having no more than about 30 mole percent of propylene which comprises adding to a composition comprising the homopolymer or copolymer about 0.02 to 5.0% by weight stearamide and about 0.02 to 5.0% by weight high density polyethylene.

The specified combination of additives is highly effective in nucleating the polymer at surprisingly low levels of addition. By promoting the more rapid crystallization of butene-1 polymers from the melt, they allow for faster processing and result in a product with a uniform microstructure. Most importantly, as shown in the illustrative embodiments which follows, the substantial improvement in the slow processing rate of the butene-1 polymers by the specified conucleants make the butene-1 polymers more viable in commercial film products. It was recognized that while it enjoys the advantages in film toughness such as tear strength, modulus and creep resistance, etc., over the competing resins, butene-1 polymers have a dificiency in processing rate compared to low density polyethylene (LDPE) and linear low density polyethylene (LLDPE) which polymers are dominating the plastic film markets. As a result, the use of the specified conucleants in promoting the processing rate of butene-1 polymer should render the polymer more attractive for many end use applications.

DESCRIPTION OF THE PREFERRED EMBODIMENTS

The butene-1 polymer composition to which the nucleating agent is added comprises an isotactic butene-1 homopolymer (polybutylene), isotactic butene-1-propylene copolymer or an isotactic butene-1-ethylene copolymer. The polymers used are suitably crystallizable thermoplastic butene-1 polymers with number average molecular weights above 15,000, preferably above 20,000, and an isotactic content above 85%, preferably above 90%, and more preferably above 95%, determined as the diethyl ether insoluble component. Suitable butene-1-ethylene copolymers contain from about 0.1 to 15 mole percent, preferably from about 0.1 to 8 mole percent of ethylene. The butene-1-ethylene copolymers are typically more difficult to crystallize at the same temperature than the butene-1 homopolymers. Suitable isotactic butene-1 polymers are commercially available and methods for their preparation are well known in the art, as shown in, for example, U.S. Pat. No. 3,362,940. Illustrative of butene-1 polymers suitable for use in the present invention (if the above requirements are met) are those known in the industry as pipe, film or molding grades.

The key aspect of the present invention is that two specific nucleating agents are employed resulting in a synergistic improvement in processing speed. These two nucleating agents are stearamide and high density polyethylene. Stearamide has the molecular structure n-$C_{17}H_{35}CONH_2$ and is commercially available from Eastman Organic Chemicals or Humko Sheffield, as subsidiary of Witco Chemicals.

The high density polyethylene employed in the composition of this invention is characterized by a density above about 0.93 g/cc and preferably at least about 0.95 g/cc. An HDPE with a melt index of from about 0.1 to 20, as measured by ASTM D1238, Condition E, is typically employed; HDPE of higher melt index may also be suitable. The melt index and molecular weight of HDPE are inversely related; the corresponding molecular weight for a polymer with a given melt index may be readily determined by routine experimentation. A particularly suitable HDPE, for example has a melt index of 0.45 g/10 min., a weight average molecular weight of about 166,000 and a density of 0.950 grams/$cm^3$. A high density polyethylene with a viscosity at mixing temperatures approximating that of the butene-1 polymer facilities intimate mixing in conventional extrusion compounding equipment. A wide variety of suitable high density polyethylenes are commercially available and methods for their preparation are well known in the art. They may be prepared by polymerization processes employing Ziegler type coordination catalysts or supported chromium oxide catalysts. Commercially available HDPE of either type is suitable. "HDPE" refers to high density polyethylene of the type described.

The relative amounts of nucleating agents are listed below in percent by weight:

|  | Preferred | More Preferred | Most Preferred |
| --- | --- | --- | --- |
| Stearamide | 0.20 to 5.0 | 0.1 to 1.0 | 0.35 to 0.65 |
| HDPE | 0.02 to 5.0 | 0.1 to 2.0 | 0.5 to 1.1 |

Typically, the crystallization rate rises and eventually tends to level off with increasing concentrations of the nucleating agent. This levelling off occurs at lower concentrations with more effective nucleating agents. In general, a more effective nucleating agent may be used in lower amounts to achieve a given nucleating effect. Preferred amounts of addition of the nucleating agent will therefore depend in part on its purity and cost; avoidance of undue structural heterogeneity from the additive and the desired crystallization rate, properties and end use of the finished composition are further considerations. The use of a finely divided or powdered nucleating agent is preferred. The method used to mix the components is not critical so long as the nucleating agent is well dispersed in the butene-1 polymer composition; conventional mixing equipment can be used, for example, a Brabender mixing head, single-screw or twin-screw extruder or Banbury mixer.

For convenience, various conventional fillers, stabilizers, processing agent, pigments, polymers and/or other materials can be added to the butene-1 polymer composition, if desired, at the same time as the nucleating agent. It is understood that these other materials or impurities are excluded when calculating the amount added of the nucleating agent of the invention.

The thermoplastic polymer composition-nucleant blend prepared according to the invention may be used in various fabrication equipment, including extrusion, thermoforming, blow molding, rotomolding, injection molding and other molding equipment, for the manufacture of pipe, film, molded articles and other items. Generally, butene-1 homopolymer compositions are preferred for the manufacture of pipe and butene-1 ethylene copolymer compositions are preferred for the manufacture of film. The polymer composition-nucleant blend crystallizes quickly and uniformly from the melt, allowing for increased speed of processing. Improvements in physical and mechanical properties of the finished items are achieved; for example, improved tensile properties, less brittleness and/or increased resistance to cracking are exhibited by thick-walled pipe prepared from the thermoplastic blends of the invention.

The invention is further illustrated by reference to the following Illustrative Embodiments, which are given for the purpose of illustration only and are not meant to limit the invention to the particular reactants and conditions employed therein.

Illustrative Embodiment I

In Illustrative Embodiment I, various different formulations were examined. The various ingredients employed in the formulations were:

| Ingredient | Trade name | Description |
| --- | --- | --- |
| butene-1-ethylene copolymer | Shell polybutylene PB 8640 | film grade, butene-1 copolymer with melt index of 1.0 dg/min and number average molecular weight of $4.14 \times 10^4$. |
| isotactic polypropylene | Shell PP5520 | A 5.0 dg/min melt flow general molding grade polypropylene |
| HDPE | Dupont Alathon 7815 | A 0.45 dg/min melt index, 0.95 g/$cm^3$ high density polyethylene |
| stearamide | Humko Sheffield Kemamide S | Monoamides |
| slip additive, oleamide | Humko Sheffield Kemamide U | Monoamides |
| Antiblocking Additive, Diatomite | Johns-Manville Celite Superfloss | A natural chalky sedimentary rock with "flux calcination" |

The propylene was added to improve the tensile properties and sealability of the butene-1 polymers while the slip antiblock (SA) package was employed to improve the packaging speed of the bags made of the butene-1 polymer film.

In all formulations, the polypropylene was compounded with the SA additive package into a masterbatch. A second masterbatch was made for each formulation compounding the polybutylene and the different nucleants. Both masterbatches were compounded on a Stewart Bolling Bunbury type mixer which has about a 6.5 lb drop size. These masterbatches were dry blended with polybutylene at a 8:1 letdown ratio and melt compounded thereafter on a Welex 3½" extruder. Next the various blends were fabricated into blow film using an Egan 3½" film line. The films were processed using a 4" die with a 0.022 die gap and a 1-½" and length. Finally the films were sealed on a Sheldahl B 308 polybag machine and submitted for physical testing of film and seals.

All formulations contained about 6.5 weight percent polypropylene and 0.075 weight percent slip and 0.3 weight percent antiblock package. The various formulations and results are presented below in Table I. The film processing rate at 1.75 mil film gauge is expressed in feet per minute (fpm) and a delta comparison over the control (without any of the said nucleating agents) is listed:

TABLE I

| Formulation # | HDPE % W. | Stearamide % W. | Processing Rate fpm | Improvement over Control fpm | % Improvement over Control % |
|---|---|---|---|---|---|
| Control | 0 | 0 | 27 | 0 | 0 |
| 1 | 1 | 0 | 37 | 10 | 37 |
| 2 | 0 | 0.2 | 39 | 12 | 44 |
| 3 | 1 | 0.2 | 50 | 23 | 85 |
| 4 | 0 | 0.4 | 42 | 15 | 56 |
| 5 | 1 | 0.4 | 55 | 28 | 105 |
| 6 | 0 | 0.6 | 39 | 12 | 44 |
| 7 | 1 | 0.6 | 52 | 25 | 93 |

From the above, it can be readily seen that the addition of both HDPE and stearamide has synergistic effects. Comparing formulation 3 to formulations 1 and 2, it can be seen that the percent improvement for HDPE plus stearamide (formulation 3) is 85%, compared to 37%+44% or 81% for the sum of HDPE alone (formulation 1) and stearamide (formulation 2). Likewise comparing formulation 5 with formulation 1 and 4 and formulation 7 with formulations 1 and 6, synergism of the present invention is readily shown.

Such synergism is not expected, and does not occur in other known combinations of nucleating agents. Comparisons are shown below in Table II for other similar formulations containing HDPE, Acrawax C (which is N,N'-ethylene-bis-stearamide) and Polywax 2000 (which is a low molecular weight polyethylene wax).

TABLE II

| Formulation # | HDPE % W. | Acrawax C % W. | Polywax 2000 % W. | Processing Rate fpm | Improvement over Control fpm | % Improvement over Control % |
|---|---|---|---|---|---|---|
| Control | 0 | 0 | 0 | 27 | 0 | 0 |
| 1 | 1 | 0 | 0 | 37 | 10 | 37 |
| 8 | 0 | 0.1 | 0 | 40 | 13 | 48 |
| 9 | 1.0 | 0.1 | 0 | 41 | 14 | 52 |
| 10 | 0 | 0 | 1.0 | 54 | 27 | 100 |
| 11 | 1.0 | 0 | 0.5 | 51 | 24 | 89 |
| 12 | 0 | 0 | 0.5 | 48 | 21 | 78 |

By comparing formulation 9 with formulations 1 and 8, it is seen that there is no synergistic improvement by using both HDPE and Acrawax C. Likewise, by comparing formulation 11 with formulation 12 and 1, it is also shown that there is no synergistic improvement by using both HDPE and Polywax 2000.

What is claimed is:

1. A method for promoting crystallization from the melt of an isotactic butene-1 homopolymer, isotactic butene-1-propylene copolymer or isotactic butene-1-ethylene copolymer having no more than about 15 mole percent by ethylene, which comprises adding to a composition comprising the homopolymer or copolymer about 0.02 to 5.0% by weight stearamide and about 0.02 to 5.0% by weight high density polyethylene.

2. The method of claim 1 wherein said composition comprises a butene-1-ethylene copolymer, stearamide and high density polyethylene.

3. The method of claim 1 wherein said composition also contains isotactic polypropylene and a slip antiblock additive package.

4. The method of claim 1 wherein said composition comprises about 0.35 to about 0.65% by weight stearamide and about 0.5 to about 1.1% by weight high density polyethylene.

5. The method of claim 1 wherein said high density polyethylene has a density above about 0.93 grams per cubic centimeter.

6. The method of claim 1 wherein said composition comprises a butene-1-propylene copolymer, steramide and high density polyethylene.

* * * * *